(12) United States Patent
Cho et al.

(10) Patent No.: US 12,707,020 B2
(45) Date of Patent: Aug. 11, 2026

(54) DATA TRANSMITTER AND DISPLAY DEVICE INCLUDING THE SAME

(71) Applicant: LX SEMICON CO., LTD., Daejeon (KR)

(72) Inventors: Hyun Pyo Cho, Daejeon (KR); Seok Jae Park, Daejeon (KR); Myung Yu Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 19/010,840

(22) Filed: Jan. 6, 2025

(65) Prior Publication Data

US 2025/0227199 A1 Jul. 10, 2025

(30) Foreign Application Priority Data

Jan. 8, 2024 (KR) ........................ 10-2024-0003185
Jan. 3, 2025 (KR) ........................ 10-2025-0000934

(51) Int. Cl.
*G09G 3/20* (2006.01)
*H04N 7/035* (2006.01)

(52) U.S. Cl.
CPC ......... *H04N 7/0352* (2013.01); *G09G 3/2092* (2013.01); *G09G 2358/00* (2013.01); *G09G 2370/04* (2013.01)

(58) Field of Classification Search
CPC .. H04N 7/0352; H04N 21/2347; H04N 19/46; H04N 21/4405; H04N 21/4408; G09G 3/2092; G09G 2358/00; G09G 2370/04
See application file for complete search history.

(56) References Cited

U.S. PATENT DOCUMENTS

2014/0132575 A1* 5/2014 Yang ........................ G09G 5/00 345/204
2014/0192097 A1* 7/2014 Baek .................... G09G 3/3688 345/87
2021/0193003 A1* 6/2021 Kim ......................... G09G 3/20
2021/0295764 A1* 9/2021 Lin ...................... G09G 3/2096
2022/0044652 A1* 2/2022 Jeong ..................... G09G 5/008

* cited by examiner

*Primary Examiner* — Temesghen Ghebretinsae
*Assistant Examiner* — Ivelisse Martinez Quiles
(74) *Attorney, Agent, or Firm* — POLSINELLI PC

(57) ABSTRACT

A data transmitter includes a first transmitting device which scrambles digital image data using a scramble key and transmits the scrambled image data; and a second transmitting device which descrambles the scrambled image data using a descramble key to restore the image data, wherein the second transmitting device restores the descramble key using predetermined pattern data input during a horizontal blank period when synchronization with the first transmitting device is released.

12 Claims, 11 Drawing Sheets

CLK

Data

Input Data

211a

Random bits

211b

Scrambled data

CLK

Data

H-Active Period
H-Blank Period
H-Active Period
(TX side)
Digital video Data
(TX side)
Scrambled data
(RX side)
Descrambled data
SOL
Pixel 1
Pixel 2
Pixel 3
...
Pixel N-2
Pixel N-1
Pixel N
EOL
'0'
Scrambled data
0-Scrambled Data
SOL : Start of Line
EOL : End of Line

Figure 5:
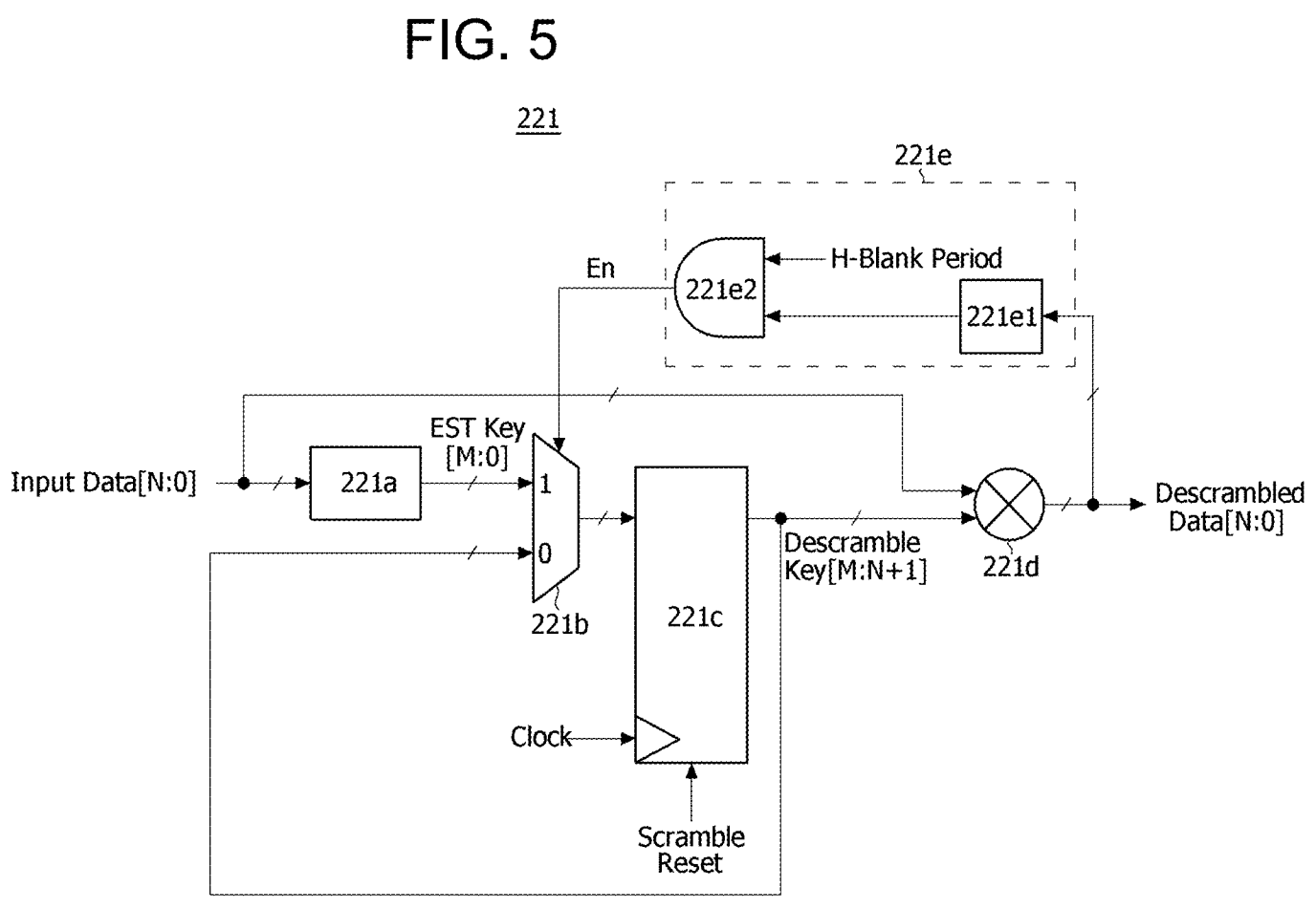

Input Data[N:0]
221a
EST Key [M:0]
221b
1
0
En
Clock
221c
Scramble Reset
Descramble Key[M:N+1]
221d
Descrambled Data[N:0]
221e
H-Blank Period
221e1
221e2

Figure 9:
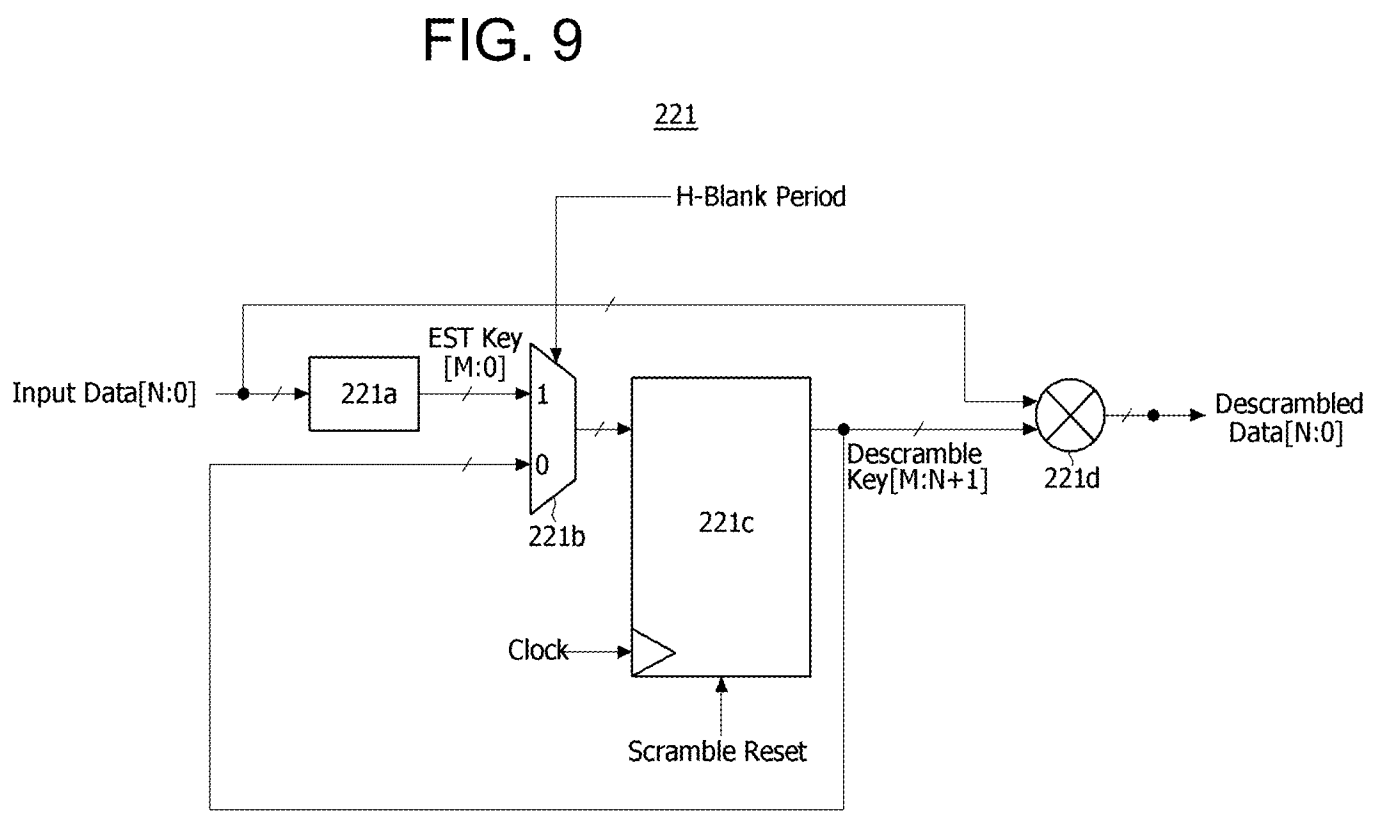

H-Blank Period

Input Data[N:0]

221a

EST Key [M:0]

1

0

221b

Clock

221c

Scramble Reset

Descramble Key[M:N+1]

221d

Descrambled Data[N:0]

H-Blank Period

Input Data[N:0]

1

0

221b

221c

Clock

Scramble Reset

Descramble Key[N:0]

221d

Descrambled Data[N:0]

DATA TRANSMITTER AND DISPLAY DEVICE INCLUDING THE SAME

CROSS-REFERENCE TO RELATED APPLICATIONS

This application claims the priorities of Korean Patent Application No. 10-2024-0003185 filed on Jan. 8, 2024, and Korean Patent Application No. 10-2025-0000934 filed on Jan. 3, 2025, which are hereby incorporated by reference in their entirety.

BACKGROUND

Field of the Disclosure

The present disclosure relates to a data transmitter and a display device including the same.

Description of the Background

As the information society develops, demands for display device for displaying images are increasing in various forms, and recently, various types of display device such as LCD (Liquid Crystal Display Device) or OLED (Organic Light Emitting Display Device) are being utilized.

The display device includes a display panel including a plurality of pixels, a data driver supplying data voltages to the display panel, a gate driver supplying gate signals to the display panel, and a timing controller controlling the data driver and gate driver.

The timing controller scrambles and transmits digital image data, and the data driver descrambles the transmitted image data to restore the original image data, and converts the restored image data into analog data voltages and supplies them to each pixel.

At this time, scrambling synchronization should occur between the transmitting side of the timing controller and the receiving side of the data driver. Scrambling synchronization may be achieved by the transmitting side transmitting special symbols or control packet information for scramble reset and the receiving side recognizing this.

However, whenever scrambling synchronization does not occur normally due to specific situations, the transmitting side should retransmit scramble reset information to the receiving side in order for the data driver to normally restore the image data.

Therefore, a method is needed to resynchronize scramble without retransmission of scramble reset information.

SUMMARY

Accordingly, the present disclosure is directed to a data transmitter and a display device including the same that substantially obviate one or more of problems due to limitations and disadvantages described above.

The present disclosure is not limited to the tasks mentioned above, and other tasks not mentioned will be clearly understood by those skilled in the art from the following descriptions.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a data transmitter may include: a first transmitting device which scrambles digital image data using a scramble key and transmits the scrambled image data; and a second transmitting device which descrambles the scrambled image data using a descramble key to restore the image data, wherein the second transmitting device may restore the descramble key using predetermined pattern data input during a horizontal blank period when synchronization with the first transmitting device is released.

The first transmitting device may transmit the scrambled image data during a horizontal active period, and scramble pattern data consisting of '0' using the scramble key during a horizontal blank period after the horizontal active period and transmit the scrambled pattern data.

The second transmitting device may include: an LFSR estimator which estimates the scramble key using the data input from the first transmitting device; a multiplexer which outputs an estimated scramble key from the LFSR estimator during the horizontal blank period; an LFSR engine part which restores and outputs the descramble key using the scramble key output from the multiplexer; and a combiner which restores the image data by performing logical operation on the data input from the first transmitting device and the descramble key output from the LFSR engine part.

The LFSR estimator may estimate the scramble key using (N)th data and (N+1)th data input from the first transmitting device, where N is a natural number.

The combiner may be an XOR gate which performs XOR operation on the input data and the descramble key.

The multiplexer may receive feedback of the descramble key output from the LFSR engine part during the horizontal active period, and output the fed-back descramble key to the LFSR engine part.

The second transmitting device may further include a comparator which selects the output of the multiplexer using the descrambled data output from the combiner and a signal indicating a horizontal blank period.

The comparator may include: a decision part which outputs '1' when the descrambled data output from the combiner is not '0'; and an AND gate which performs logical operation on the output of the decision part and the signal indicating the horizontal blank period to control the output of the multiplexer.

In another aspect of the present disclosure, a display device may include: a display panel having pixels arranged in regions where a plurality of gate lines and data lines intersect; a gate driver which outputs gate signals through the gate lines; a data driver which outputs data voltage through the data lines; and a timing controller which controls the gate driver and the data driver, wherein the timing controller may include a first transmitting device which scrambles digital image data using a scramble key and transmits the scrambled image data, the data driver may include a second transmitting device which descrambles the scrambled image data using a descramble key to restore the image data, and wherein the second transmitting device may restores the descramble key using predetermined pattern data input during a horizontal blank period when synchronization with the first transmitting device is released.

The second transmitting device may include: a multiplexer which outputs data input during a horizontal blank period; an LFSR engine part configured to restore and output the descramble key using data output from the multiplexer; and a combiner which restores the image data by performing logical operation on data input from the first transmitting device and the descramble key output from the LFSR engine part.

The multiplexer may receive feedback of the descramble key output from the LFSR engine part during a horizontal active period, and to output the fed-back descramble key to the LFSR engine part.

According to various aspects of the present disclosure, when data scrambling synchronization does not occur normally at the receiving device due to specific situations, by enabling restoration of a descramble key using data input during a horizontal blank period without receiving retransmission of scramble reset information from the transmitting device, data scramble resynchronization may be performed quickly.

These Advantageous Effects are not limited to the effects mentioned above, and other effects not mentioned will be clearly understood by those skilled in the art from the descriptions in the Claims.

BRIEF DESCRIPTION OF THE DRAWINGS

The above and other features and advantages of the present disclosure will become more apparent to those of ordinary skill in the art by describing exemplary aspects thereof in detail with reference to the attached drawings, in which:

FIG. 3 is a drawing for explaining the configuration and operation principle of the scrambler shown in FIG. 2;

FIG. 5 is a drawing showing the configuration of the descrambler according to a first aspect shown in FIG. 2;

FIG. 9 is a drawing showing a configuration of a modified descrambler of FIG. 5;

FIG. 10 is a drawing showing a configuration of a descrambler according to a second aspect shown in FIG. 2;

DETAILED DESCRIPTION

Figure 1:
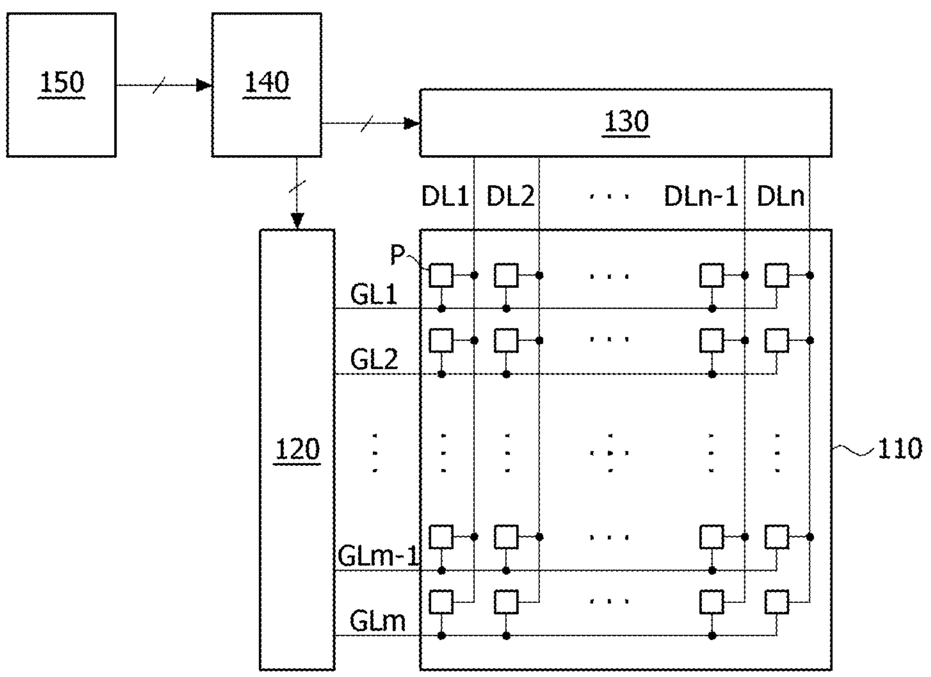
FIG. 1 is a drawing showing a display device according to an aspect of the present disclosure.

The advantages and features of the present disclosure, and methods of achieving them will be apparent from the aspects described in detail below in conjunction with the accompanying drawings. However, the present disclosure is not limited to the following aspects, which may be implemented in various different forms; rather, the present aspects are provided to make the disclosure of the present disclosure complete and to allow those skilled in the art to fully understand the scope of the present disclosure, and the present disclosure is defined only within the scope of the appended claims.

The shapes, sizes, proportions, angles, numbers and the like shown in the accompanying drawings for the purpose of describing the aspects of the present disclosure are merely examples, and the present disclosure is not limited thereto. Like reference numerals generally denote like elements throughout the present specification. Further, in describing the present disclosure, detailed descriptions of known related technologies may be omitted so as not to unnecessarily obscure the subject matter of the present disclosure.

The terms such as “comprising,” “including,” “having,” and “consisting of” used herein are generally intended to allow other components to be added unless the terms are used with the term “only.” References to the singular shall be construed to include the plural unless expressly stated otherwise.

In interpreting components, they are construed to include a margin of error, even if it is not explicitly stated.

When describing a positional or interconnected relationship between two components, such as “on top of,” “above,” “below,” “next to,” “connect or couple with,” “crossing,” “intersecting,” etc., one or more other components may be interposed between them unless “immediately” or “directly” is used.

When describing a temporal contextual relationship is described, such as “after,” “following,” “next to,” or “before,” it may not be continuous on a time scale unless “immediately” or “directly” is used.

First, second, and the like may be used before the names of the components to distinguish the components, but the function or structure thereof is not limited by such ordinal number or component name. For ease of description, the ordinal numbers placed before the names of the same components may differ between aspects.

The following aspects may be combined or associated with each other in whole or in part, and various types of interlocking and driving are technically possible. The aspects may be implemented independently of each other or together in an interrelated relationship.

Hereinafter, various aspects of the present disclosure will be described in detail with reference to the attached drawings.

FIG. 1 is a drawing showing a display device according to the present disclosure.

Referring to FIG. 1, the display device 100 according to an aspect the present disclosure may include a display panel 110, a gate driver 120, a data driver 130, and a timing controller 140. The display device 100 may further include a host system 150 which supplies various timing signals to the timing controller 140.

The display panel 110 may include a plurality of gate lines G1-Gm and a plurality of data lines D1-Dn arranged to intersect to define multiple pixel regions, and pixels P provided in each of the multiple pixel regions. The pixel P may include a red sub-pixel R emitting red light, a green sub-pixel G emitting green light, and a blue sub-pixel B emitting blue light.

The gate driver 120 may be arranged on one side, for example, the left side of the display panel 110, but depending on the case, may be arranged on both sides, for example, the left side and right side facing each other of the display panel 110. The gate driver 120 may include multiple gate driver ICs (gate driver Integrated Circuit, not shown).

The gate driver 120 may be in the form of a Tape Carrier Package with a gate driver IC mounted, but is not necessarily limited thereto, and the gate driver IC may be directly mounted on the display panel 110.

The data driver 130 converts digital image signals transmitted from the timing controller 140 into analog source signals and outputs them to the display panel 110. Specifically, the data driver 130 outputs analog source signals to data lines D1-Dn in response to data control signals (DCSs: Data Control Signals) transmitted from the timing controller 140.

The data driver 130 may be arranged on one side, for example, the upper side of the display panel 110, but depending on the case, may be arranged on both sides, for example, the upper side and lower side facing each other of the display panel 110. Also, the data driver 130 may be in the form of a tape carrier package with a source driver IC mounted, but is not necessarily limited thereto.

The timing controller 140 receives various timing signals including vertical sync signal (Vsync), horizontal sync signal (Hsync), data enable signal (DE: Data Enable), clock signal (CLK), etc. from the host system 150 to generate the data control signals (DCSs) for controlling the data driver 130 and gate control signals (GCSs) for controlling the gate driver 120. Also, the timing controller 140 may receive image data (RGB) from the host system 150 and convert and output them into image data (RGB') which may be processed by the data driver 130.

The data control signals DCSs may include source start pulse (Source Start Pulse: SSP), source sampling clock (Source Sampling Clock: SSC), and source output enable signal (Source Output Enable: SOE), etc., and the gate control signals GCS may include gate start pulse (Gate Start Pulse: GSP), gate shift clock (Gate Shift Clock: GSC), and gate output enable signal (Gate Output Enable: GOE), etc.

The host system 150 may be implemented as any one of navigation system, set-top box, DVD player, Blu-ray player, personal computer (PC), home theater system, broadcast receiver, or phone system.

The host system 150 may include a SoC (System On Chip) with built-in scaler to convert input digital image data RGB into a format suitable for display on the display panel 110. The host system 150 may transmit digital image data RGB and timing signals to the timing controller 140.

In the aspect of the present disclosure, although it is explained as an example of transmitting image data between the timing controller and the data driver, it is not limited thereto. For example, it may be possible to apply to the case of transmitting image data between the host system and the timing controller.

Figure 2:
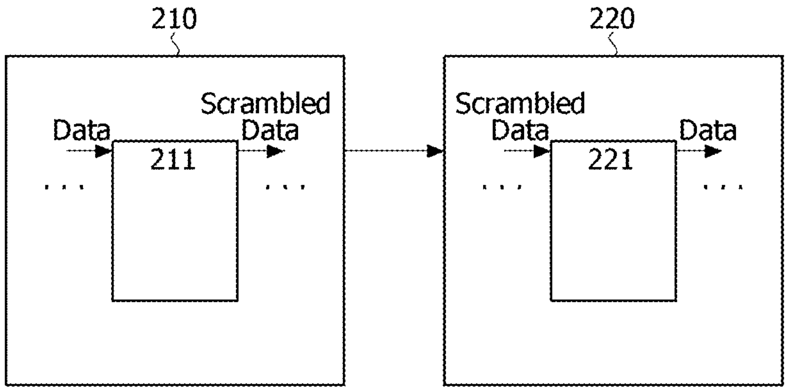
FIG. 2 is a drawing showing a data transmitter applied to FIG. 1.
Figure 3:
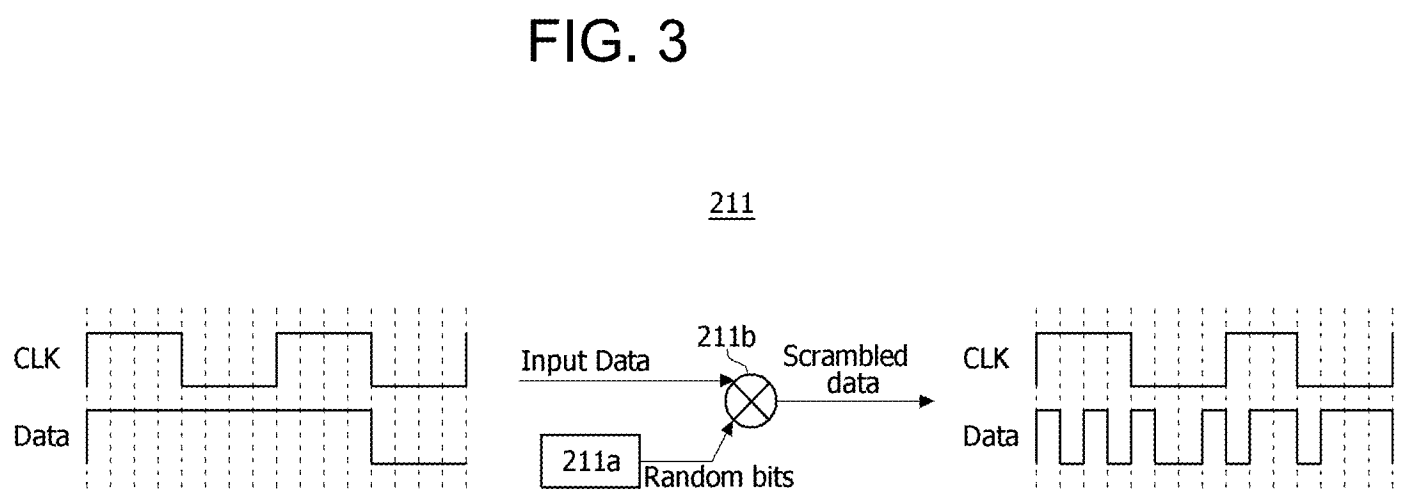

FIG. 2 is a drawing showing a data transmitter applied to FIG. 1, and FIG. 3 is a drawing for explaining the configuration and operation principle of the scrambler shown in FIG. 2.

Here, the data transmitter includes the timing controller 140 and the data driver 130 of FIG. 1, and the timing controller 140 includes a first transmitting device 210, and the data driver 130 includes a second transmitting device 220, but is not limited thereto.

Referring to FIG. 2, the data transmitter according to the present disclosure may include a first transmitting device 210 and a second transmitting device 220. The first transmitting device 210 receives data from the host system of FIG. 1, and may transmit data (for example, image data) to the second transmitting device 220. The first transmitting device 210 may be referred to as a transmitting device, and the second transmitting device 220 may be referred to as a receiving device.

The first transmitting device 210 may include a scrambler 211. The scrambler 211 may scramble input digital image data. The scrambler 211 may include an LFSR (Linear Feedback Shift Register) 211*a*, and a combiner 211*b* as shown in FIG. 3.

The LFSR 211*a* may be implemented by a predetermined polynomial, and may generate a random bit sequence or a scramble key for data scrambling. Such data scrambling may not only encrypt data but also improve EMI noise and maximize coding efficiency by randomly generating repetitive data sequences in case of high-speed communication.

The combiner 211*b* may output scrambled data by performing logical operation to mix digital image data with the random bit sequence generated from LFSR 211*a*. For example, the combiner 211*b* may be implemented as an XOR gate, but is not limited thereto.

The second transmitting device 220 may receive the scrambled data from the first transmitting device 210, and restore the image data by descrambling the received scrambled data.

The present aspects are designed, when data scrambling synchronization does not occur normally at the receiving device due to specific situations, to restore a descramble key using the data input during a horizontal blank period without receiving retransmission of scramble reset information from the transmitting device.

Figure 4:
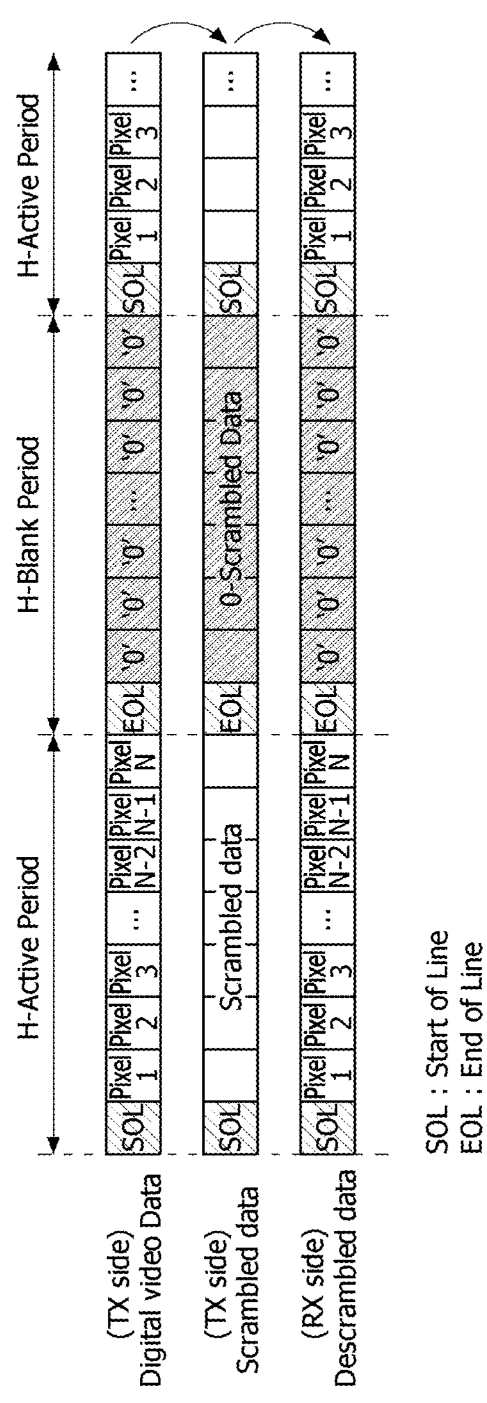
FIG. 4 is a drawing for explaining the descrambling principle according to the present disclosure.

FIG. 4 is a drawing for explaining the descrambling principle according to the present disclosure.

Referring to FIGS. 2 and 4, the first transmitting device 210 receives image data from the host system and configures to them to include SOL (Start of Line), digital image data, EOL (End of Line), and pattern data based on received image data. The data configured in this way is input to the scrambler 211.

The scrambler 211 of the first transmitting device 210 scrambles the input digital image data using a random bit sequence to transmit scrambled data during a horizontal active period, and scrambles data consisting of '0' to transmit scrambled pattern data during a horizontal blank period.

In this case, special symbols such as SOL (Start of Line) and EOL (End of Line) have unique values, and to maintain these unique values, they are not scrambled. Here, although SOL and EOL symbols are used, other symbols may be used according to the interface protocol.

The descrambler 221 of the second transmitting device 220 may generate a descramble key using scrambled pattern data received during the horizontal blank period, and restore the digital image data by descrambling the received scramble data using the generated descramble key.

Here, the scrambled pattern data transmitted during the horizontal blank period is data scrambled using the scramble key being used at first transmitting device 210 on the transmitting side.

To elaborate, the pattern data consists of data composed of '0'. At the first transmitting device 210, scrambled pattern data is generated by XOR operation of the pattern data consisting of '0' and the scramble key. The scrambled pattern data thus generated has the same value as the scramble key. This is because XOR operation of each bit of data consisting of '0' with '0' becomes '0', and XOR operation of each bit of data consisting of '0' with '1' becomes '1'. Therefore, at the second transmitting device 220, the descramble key may be generated using the scrambled pattern data without retransmission of scramble reset information.

Therefore, in the present disclosure, by utilizing characteristics of the scrambled pattern data transmitted during a specific period such as a horizontal blank period, scramble resynchronization may automatically occur by itself even without receiving scramble reset information again from the transmitting side.

In a first aspect of the present disclosure, as an example, it will be explained regarding a case where the number of bits of data input to the descrambler differs from the number of bits processed in the descrambler.

Figure 6:
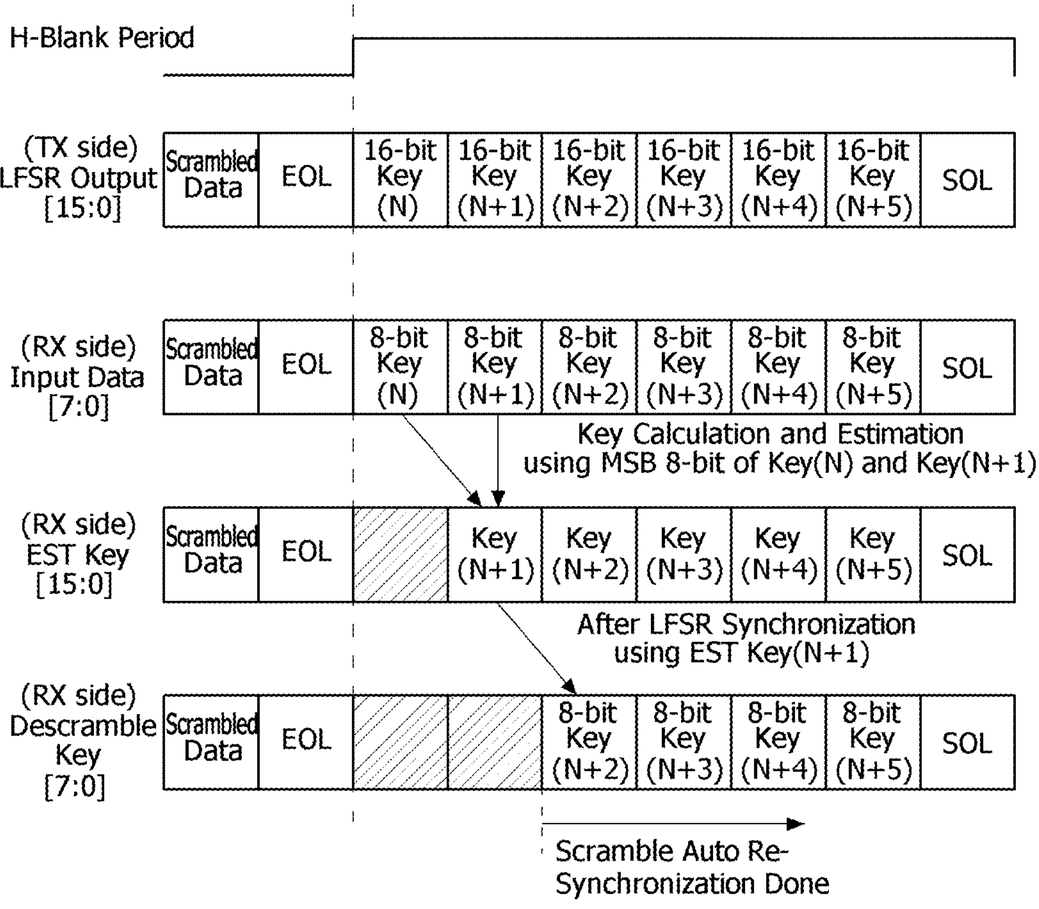
FIGS. 6 and 7 are drawings for explaining the principle of a scramble key estimation according to the present disclosure.
Figure 7:
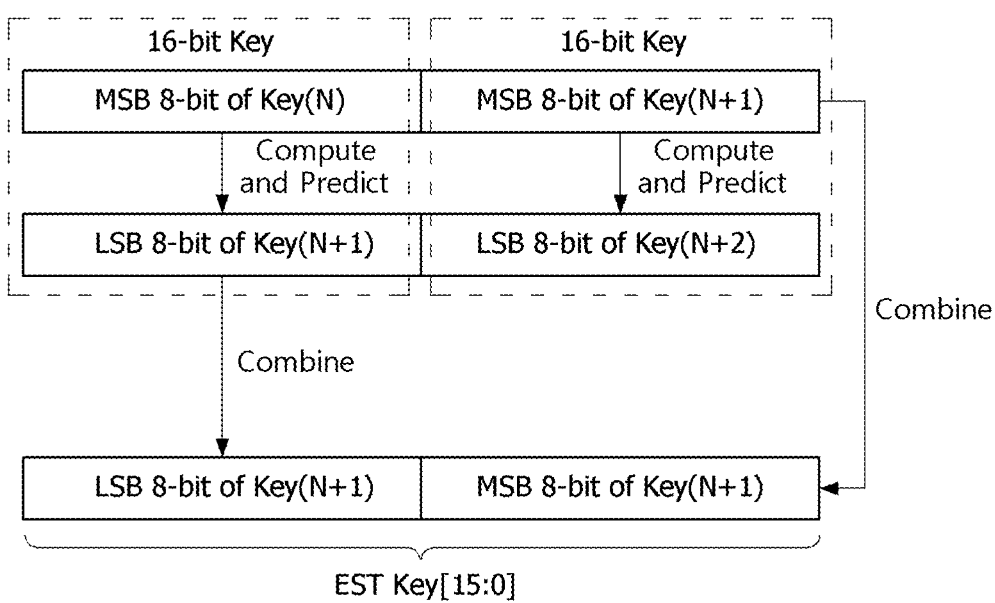

FIG. 5 is a drawing showing the configuration of the descrambler according to the first aspect of the present disclosure shown in FIG. 2, and FIGS. 6 and 7 are drawings for explaining the principle of a scramble key estimation according to the present disclosure.

Referring to FIG. 5, the descrambler 221 according to the first aspect may include a LFSR estimator 221*a*, a multiplexer 221*b*, a LFSR engine part 221*c*, a combiner 221*d*, and a data comparator 221*e*.

While data input during a horizontal active period is directly input to the combiner 221*d*, it is not transferred to the LFSR engine part 221*c* through the LFSR estimator 221*a*. Data input during a horizontal blank period is directly input to the combiner 221*d*, and transferred to the LFSR engine part 221*c* through the LFSR estimator 221*a*.

The LFSR estimator 221*a* may estimate the scramble key having the number of bits which may be processed in the LFSR engine part 221*c* using data input during the horizontal blank period, and transfer the estimated scramble key to the LFSR engine part 221*c* through the multiplexer 221*b*.

For example, when the input data is 8 bits and the LFSR engine part 221*c* processes 16 bits, as shown in FIG. 6, the LFSR estimator 221*a* may estimate the scramble key (EST Key) using (N)th 8-bit key and (N+1)th 8-bit key, and may estimate (N+1)th 16-bit estimated scramble key (Key(N+1)).

Here, since (N)th 8-bit key and (N+1)th 8-bit key constitute one 16-bit key, (N)th 8-bit key may be upper bit key including MSB (Most Significant Bit), and (N+1)th 8-bit key may be lower bit key including LSB (Least Significant Bit).

To elaborate, as shown in FIG. 7, the LFSR estimator 221*a* may predict the next (N+1)th 8-bit key from the input (N)th 8-bit key using the predetermined polynomial, and predict the next (N+2)th 8-bit key from the input (N+1)th 8-bit key. The LFSR estimator 221*a* may estimate the (N+1)th 16-bit key as the scramble key by combining the predicted (N+1)th 8-bit key and the input (N+1)th 8-bit key.

In this case, the predicted (N+2)th 8-bit key is used when estimating the next scramble key.

The multiplexer 221*b* has a first input terminal connected to an output terminal of the LFSR estimator 221*a*, and a second input terminal connected to an output terminal of the LFSR engine part 221*c*. The multiplexer 221*b* transfers the estimated scramble key by the LFSR estimator 221*a* to the LFSR engine part 221*c* by high logic level of an enable signal output from the data comparator 221*e*. On the other hand, the multiplexer 221*b* receives feedback of the descramble key output from the LFSR engine part 221*c* and transfers it by low logic level of the enable signal output from the data comparator 221*e*.

The LFSR engine part 221*c* generates the descramble key using the estimated scramble key during a horizontal blank period, and outputs the descramble key output in the previous cycle during a horizontal active period. Since the LFSR engine part 221*c* is implemented by a predetermined polynomial, it may generate the descramble key using the predetermined polynomial.

In this case, since the descramble key generated using the estimated scramble key in the LFSR engine part 221*c* is 16 bits, only 8 bits of the descramble key is needed to descramble the input 8-bit data. Therefore, the LFSR engine part 221*c* may extract and output upper 8 bits of the descramble key from the generated 16-bit descramble key.

At this time, the LFSR engine part 221*c* generates (N+1)th 16-bit descramble key and outputs 8 bits of (N+2)th 16-bit descramble key at the next clock.

The LFSR engine part 221*c* of the present disclosure explains as an example generating a descramble key using data input during a horizontal blank period in a certain exceptional situation where non-synchronization may occur, and basically may generate the descramble key using the scramble reset information transferred from the transmitting side.

The data comparator 221*e* outputs an enable signal of high logic level or low logic level for controlling the multiplexer 221*b* based on the descrambled data and the signal indicating a horizontal blank period.

The data comparator 221*e* includes a comparator 221*e*1 and an AND gate 221*e*2. The comparator 221*e*1 receives descrambled data and outputs '1' if the received data is not '0' and outputs '0' if the received data is '0'. The AND gate 221*e*2 performs logical operation on the signal indicating the horizontal blank period and the output of comparator 221*e*1 to output the enable signal (En) of high logic level or enable signal (En) of low logic level.

That is, the data comparator 221*e* transfers an estimated scramble key from the LFSR estimator 221*a* to the LFSR engine part 221*c* during a horizontal blank period when the descrambled data is not '0'.

On the other hand, the data comparator 221*e* may transfer the descramble key generated in the previous cycle to the LFSR engine part 221*c* when not in a horizontal blank period or the descrambled data is '0'.

The combiner 221*d* may generate and output the descrambled data by descrambling the input data using the descramble key output from the LFSR engine part 221*c*.

Figure 8:
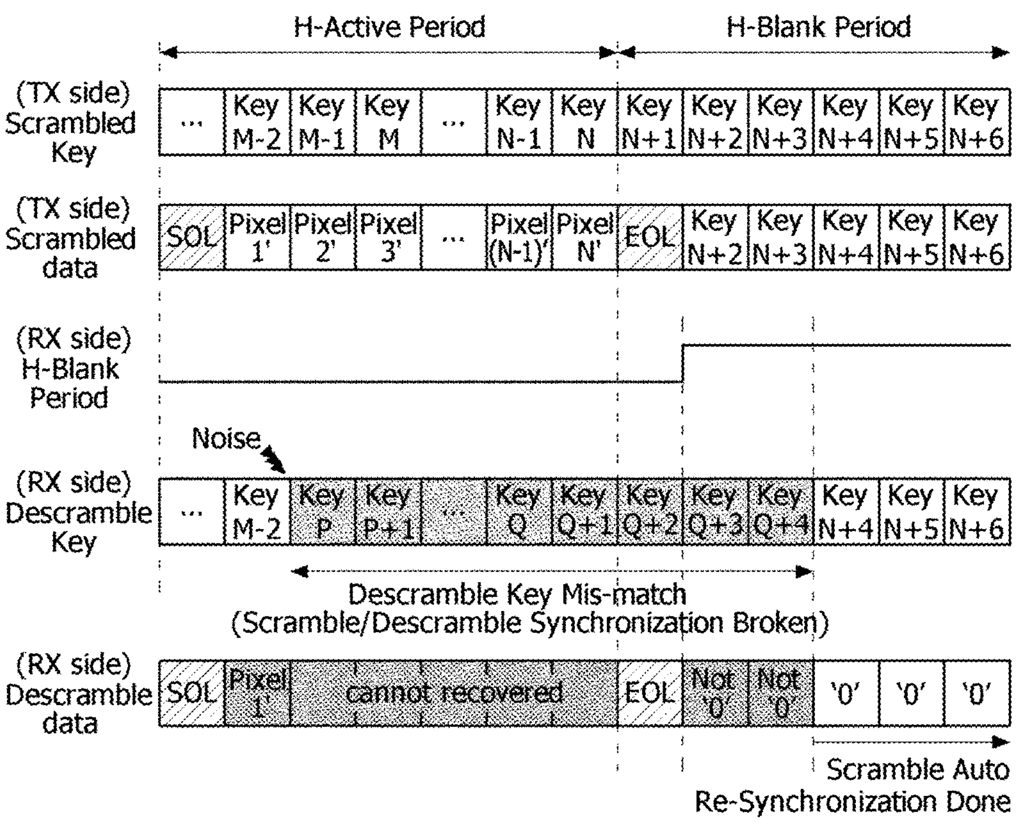
FIG. 8 is a drawing showing scramble resynchronization by FIG. 5.

FIG. 8 is a drawing showing scramble resynchronization by FIG. 5.

Referring to FIG. 8, in the present disclosure, when scrambling synchronization is released due to noise etc. during a horizontal active period in which scrambled data us received, scramble resynchronization automatically occurs using the data input during a horizontal blank period (H-Blank).

Although scramble resynchronization does not occur within the horizontal active period where noise occurred, when entering the horizontal blank period (H-Blank), scramble resynchronization occurs after generating the scramble key using two data after EOL.

FIG. 9 is a drawing showing a configuration of a modified descrambler of FIG. 5.

Referring to FIG. 9, the modified descrambler 221 may include an LFSR estimator 221*a*, a multiplexer 221*b*, an LFSR engine part 221*c*, and a combiner 221*d*.

While data input during a horizontal active period is directly input to the combiner 221*d*, it is not transferred to the LFSR engine part 221*c* through the LFSR estimator 221*a*. Data input during a horizontal blank period is directly input to the combiner 221*d*, and transferred to the LFSR engine part 221*c* through the LFSR estimator 221*a*.

The LFSR estimator 221*a* may estimate the scramble key having number of bits which may be processed in the LFSR engine part 221*c* using the data input during a horizontal blank period, and transfer the estimated scramble key to the LFSR engine part 221*c* through the multiplexer 221*b*.

The multiplexer 221*b* has a first input terminal connected to an output terminal of the LFSR estimator 221*a*, and a second input terminal connected to an output terminal of the LFSR engine part 221*c*. The multiplexer 221*b* transfers the estimated scramble key by the LFSR estimator 221*a* to the LFSR engine part 221*c* or receives feedback of data i.e., the descramble key output from the LFSR engine part 221*c* and transfers it based on the signal indicating the horizontal blank period.

For example, when the signal indicating the blank period is '1', the multiplexer 221*b* transfers the estimated scramble key by the LFSR estimator 221*a* to the LFSR engine part 221*c*. When the signal indicating the blank period is '0', the multiplexer 221*b* receives feedback of data i.e., the descramble key output from the LFSR engine part 221*c* and transfers it to the LFSR engine part 221*c*.

The LFSR engine part 221*c* generates the descramble key using the estimated scramble key during the horizontal blank period, and outputs the descramble key output in the previous cycle during the horizontal active period.

The combiner 221*d* may generate and output descrambled data by descrambling input data using the descramble key output from the LFSR engine part 221*c*.

In the second aspect of present disclosure, as an example, it will be explained regarding a case where the number of bits of data input to the descrambler is same as the number of bits processed in the descrambler.

Figure 10:
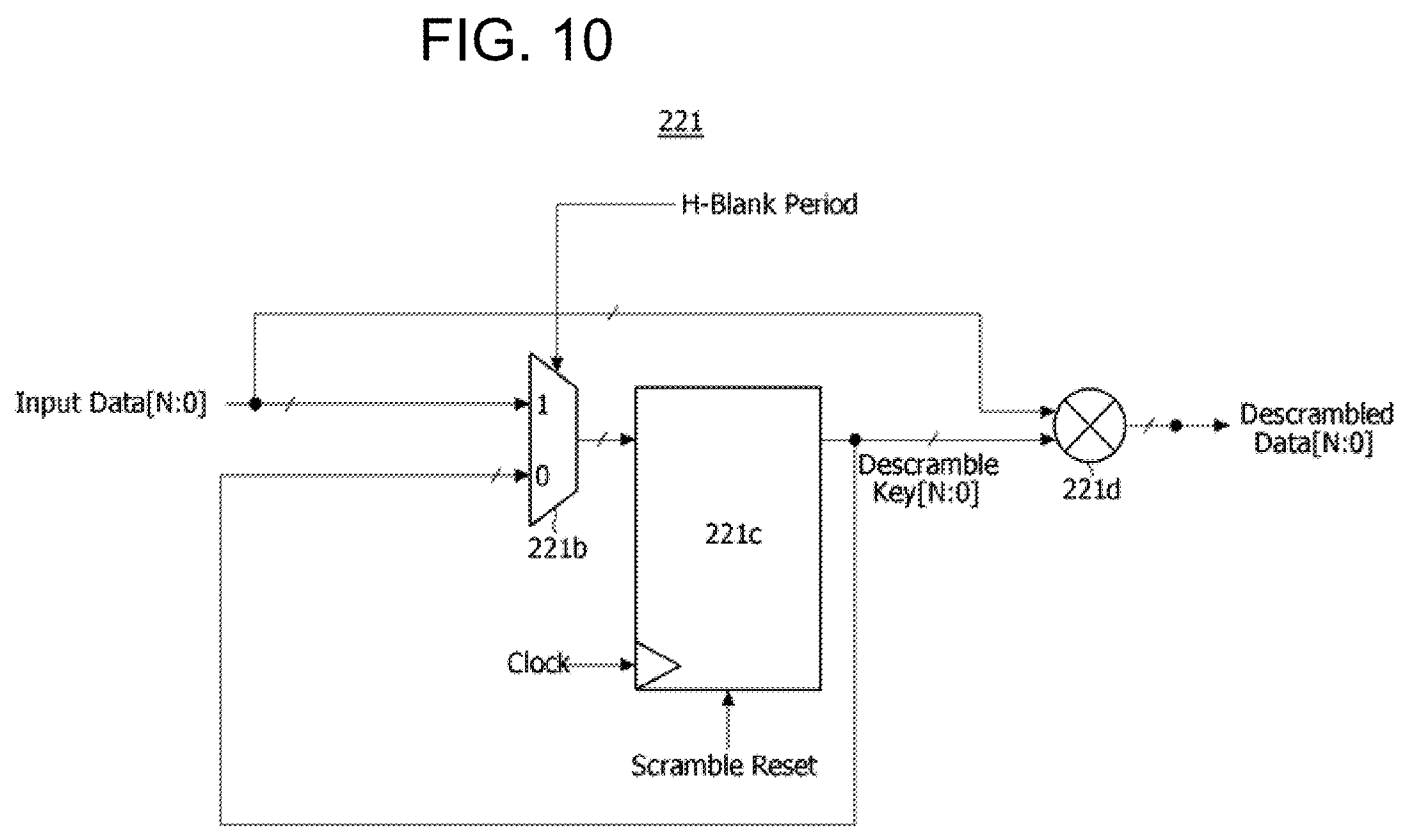

FIG. 10 is a drawing showing a configuration of a descrambler according to the second aspect shown in FIG. 2.

Referring to FIG. 10, the descrambler 221 according to the second aspect may include a multiplexer 221*b*, an LFSR engine part 221*c*, and a combiner 221*d*.

While data input during a horizontal active period is directly input to the combiner 221*d*, it is not transferred to the LFSR engine part 221*c* through the multiplexer 221*b*. Data input during a horizontal blank period is directly input to the combiner 221*d*, and transferred to the LFSR engine part 221*c* through the multiplexer 221*b*.

The first input terminal of the multiplexer 221*b* receives data, and the second input terminal is connected to output terminal of the LFSR engine part 221*c*. The multiplexer 221*b* transfers data input through the first input terminal to the LFSR engine part 221*c* by high logic level of an enable signal. On the other hand, the multiplexer 221*b* receives feedback of the descramble key output from the LFSR engine part 221*c* and transfers it by low logic level of the enable signal.

The LFSR engine part 221*c* generates the descramble key using input pattern data during a horizontal blank period, and outputs the descramble key output in the previous cycle during a horizontal active period. Since the LFSR engine part 221*c* is implemented by a predetermined polynomial, it may generate the descramble key using the predetermined polynomial.

The LFSR engine part 221*c* of the present disclosure is explained as an example regarding generating the descramble key using the data input during a horizontal blank period in a certain exceptional situation where non-synchronization may occur, and basically may generate the descramble key using the scramble reset information transferred from the transmitting side.

The combiner 221*d* may generate and output the descrambled data by descrambling input data using the descramble key output from the LFSR engine part 221*c*.

Figure 11:
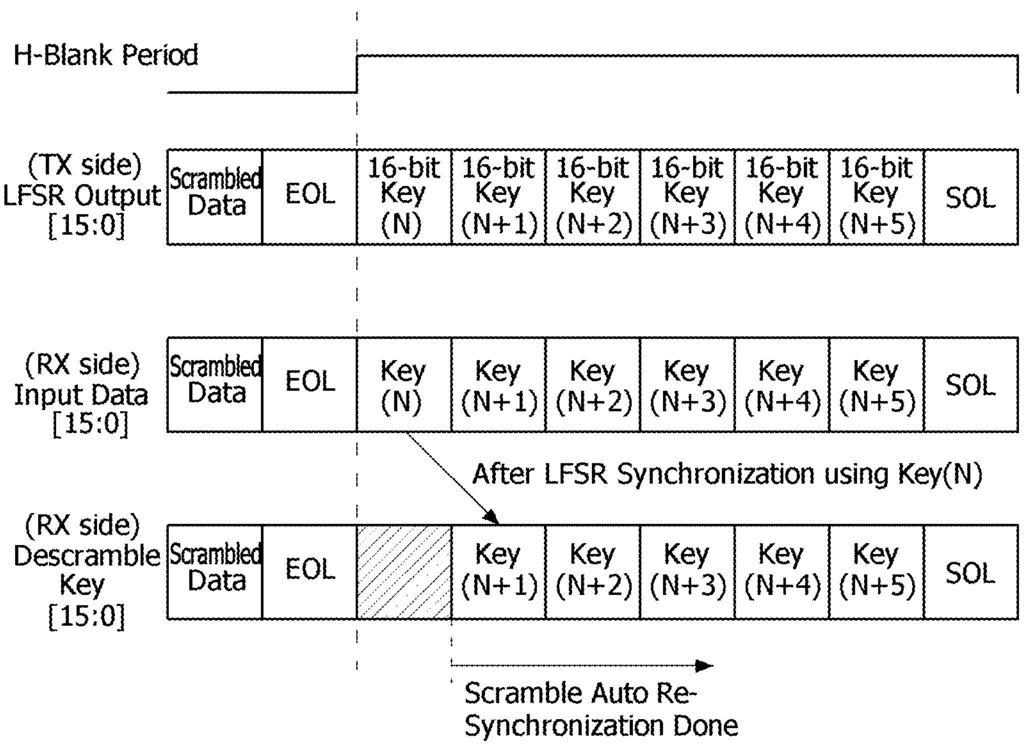
FIG. 11 is a drawing showing scramble resynchronization by FIG. 10.

FIG. 11 is a drawing showing scramble resynchronization by FIG. 10.

Referring to FIG. 11, in the present disclosure, when scrambling synchronization is released due to noise etc. during a horizontal active period in which the scrambled data is received, scramble resynchronization automatically occurs using the data input during a horizontal blank period (H-Blank).

Although scramble resynchronization does not occur within the horizontal active period where noise occurred, when entering the horizontal blank period (H-Blank), scramble resynchronization occurs after generating the scramble key using one data after EOL.

Figure 12:
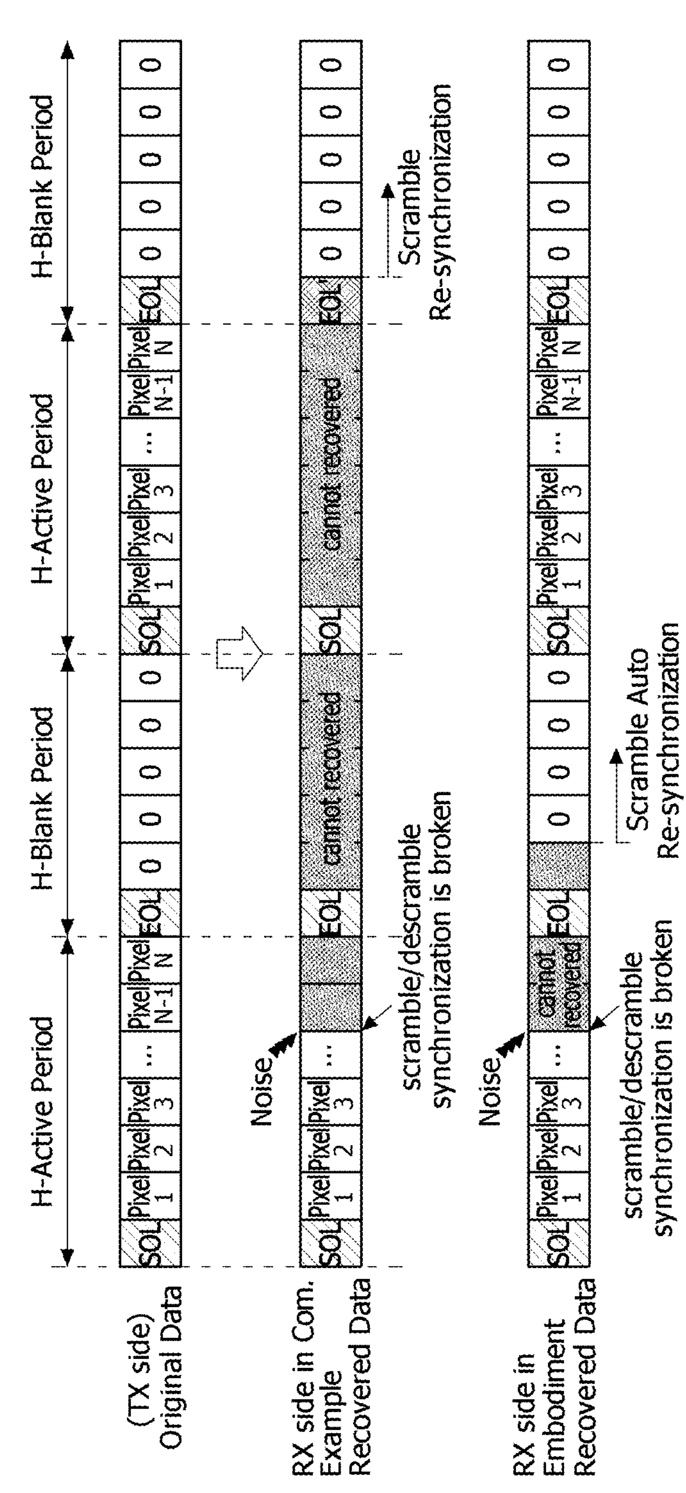
FIG. 12 is a drawing for comparing and explaining scramble resynchronization results of a comparative example and an aspect of the present disclosure.

FIG. 12 is a drawing for comparing and explaining scramble resynchronization results of a comparative example and an aspect of the present disclosure.

Referring to FIG. 12, when a horizontal blank period (H-Blank) is driven between horizontal active periods (H-Active), in the comparative example, when scrambling synchronization is released due to noise etc. during a horizontal active period (H-Active), since the scramble reset information should be received in the next horizontal active period (H-Active), scramble resynchronization occurs using scramble reset information included in EOL' transmitted after the horizontal active period (H-Active) in which the noise occurred, a horizontal blank period (H-Blank), and the next horizontal active period (H-Active).

On the other hand, in the present disclosure, when scrambling synchronization is released due to noise etc. during a horizontal active period (H-Active), when entering a horizontal blank period (H-Blank), scramble resynchronization automatically occurs right away using the data input during a horizontal blank period (H-Blank).

Therefore, in the present disclosure, scramble resynchronization may occur much faster than comparative example, and moreover, there is no need to receive scramble reset information from transmitting side.

While the various aspects of the present disclosure have been described in more detail with reference to the accompanying drawings, the present disclosure is not necessarily limited to these aspects and may be practiced in various modifications without departing from the spirit of the present disclosure. Therefore, the aspects disclosed in the present disclosure are provided for illustrative purposes only and are not intended to limit the technical concept of the present disclosure, and the scope of the technical concept of the present disclosure is not limited thereto. Thus, it is intended that the present disclosure covers the modifications and variations of the aspects provided they come within the scope of the appended claims and their equivalents.

What is claimed is:

1. A data transmitter, comprising:

a timing controller including a scrambler configured to scramble digital image data using a scramble key and transmit the scrambled digital image data; and a data driver including a descrambler configured to descramble the scrambled digital image data using a descramble key to restore the digital image data, wherein the descrambler restores the descramble key using predetermined pattern data input during a horizontal blank period when synchronization with the timing controller including the scrambler is released.

2. The data transmitter according to claim 1, wherein the scrambler is configured to:

transmit the scrambled digital image data during a horizontal active period, and scramble pattern data consisting of '0' using the scramble key during a horizontal blank period after the horizontal active period and transmits the scrambled pattern data.

3. The data transmitter according to claim 1, wherein the descrambler includes:

a linear feedback shift register (LFSR) estimator configured to estimate the scramble key using the predetermined pattern data input from the scrambler;

a multiplexer configured to output an estimated scramble key from the LFSR estimator during the horizontal blank period;

an LFSR engine part configured to restore and output the descramble key using the estimated scramble key output from the multiplexer; and a combiner configured to restore the digital image data by performing logical operation on data input from the scrambler and the descramble key output from the LFSR engine part.

4. The data transmitter according to claim 3, wherein the LFSR estimator is configured to estimate the scramble key using (N)th data and (N+1)th data input from the scrambler, where N is a natural number.

5. The data transmitter according to claim 3, wherein the combiner is an XOR gate which performs XOR operation on the input data and the descramble key.

6. The data transmitter according to claim 3, wherein the multiplexer is configured to receive feedback of the descramble key output from the LFSR engine part during the horizontal active period, and to output the fed-back descramble key to the LFSR engine part.

7. The data transmitter according to claim 3, wherein the descrambler further includes a data comparator which selects an output of the multiplexer using descrambled data output from the combiner and a signal indicating a horizontal blank period.

8. The data transmitter according to claim 7, wherein the data comparator includes:

a comparator configured to output '1' when the descrambled data output from the combiner is not '0'; and an AND gate configured to output signal for controlling output of the multiplexer by performing logical operation on the output of the comparator and the signal indicating the horizontal blank period.

9. A display device, comprising:

a display panel having pixels arranged in regions where a plurality of gate lines and a plurality of data lines intersect;

a gate driver configured to output gate signals through the plurality of gate lines;

a data driver configured to output data voltages through the plurality of data lines; and a timing controller configured to control the gate driver and the data driver, wherein the timing controller includes a scrambler which scrambles digital image data using a scramble key and transmits the scrambled digital image data, the data driver includes a descrambler which descrambles the scrambled digital image data using a descramble key to restore the digital image data, and wherein the descrambler is configured to restore the descramble key using predetermined pattern data input during a horizontal blank period when synchronization with the timing controller including the scrambler is released.

10. The display device according to claim 9, wherein the scrambler is configured to:

transmit the scrambled digital image data during a horizontal active period, and transmit scrambled pattern data by scrambling pattern data consisting of '0' using the scramble key during the horizontal blank period after the horizontal active period.

11. The display device according to claim 9, wherein the descrambler includes:

a multiplexer configured to output data input during a horizontal blank period;

a linear feedback shift register (LFSR) engine part configured to restore and output the descramble key using the data output from the multiplexer; and a combiner configured to restore the digital image data by performing logical operation on data input from the scrambler and the descramble key output from the LFSR engine part.

12. The display device according to claim 11, wherein the multiplexer is configured to receive feedback of the descramble key output from the LFSR engine part during a horizontal active period, and to output the fed-back descramble key to the LFSR engine part.

* * * * *